Figure 2:
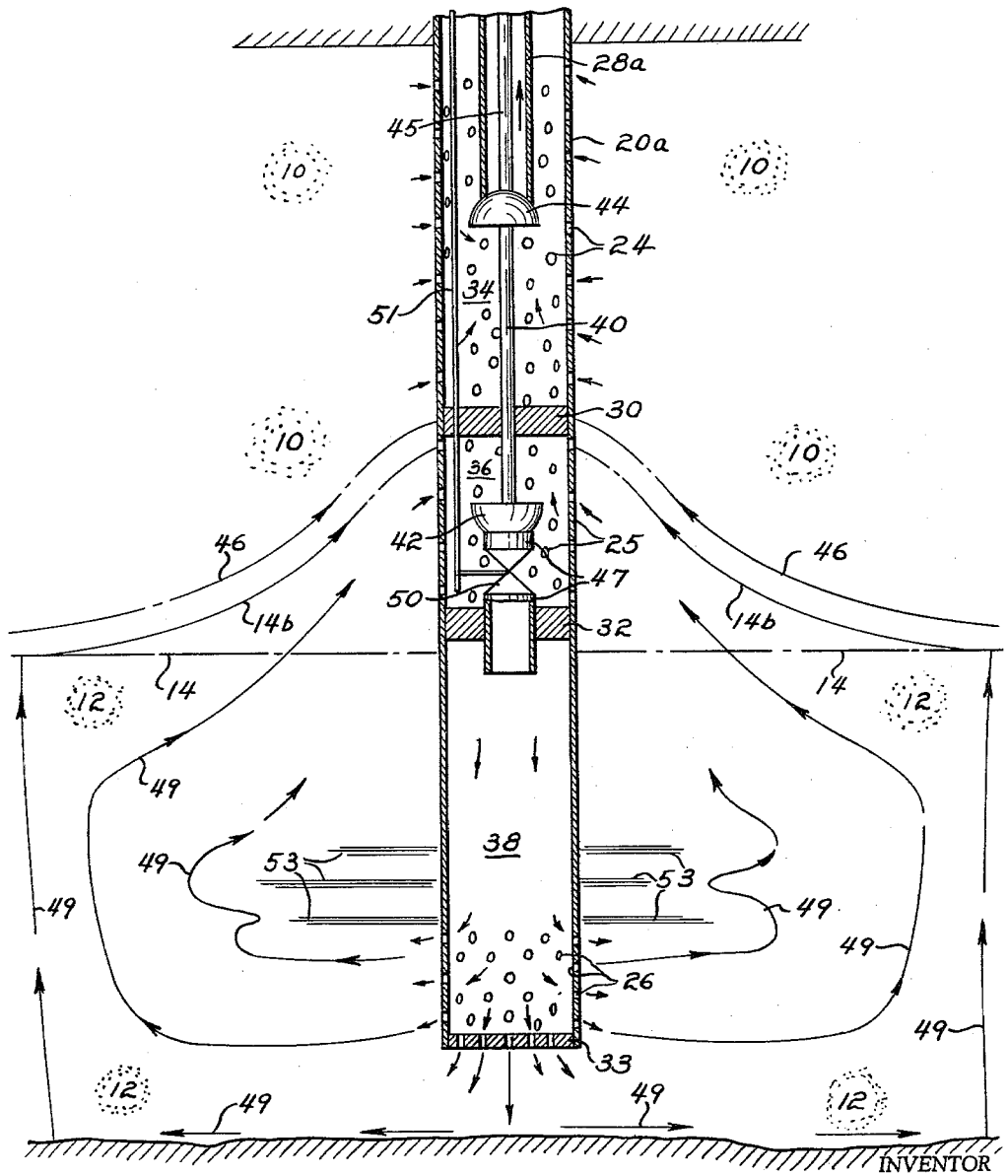

July 20, 1965
C. E. JACOB
3,195,633
METHOD AND APPARATUS FOR PRODUCING FRESH WATER
OR PETROLEUM FROM UNDERGROUND RESERVOIR
FORMATIONS WITHOUT CONTAMINATION OF
UNDERLYING HEAVIER LIQUID
Filed Aug. 26, 1960
2 Sheets-Sheet 1
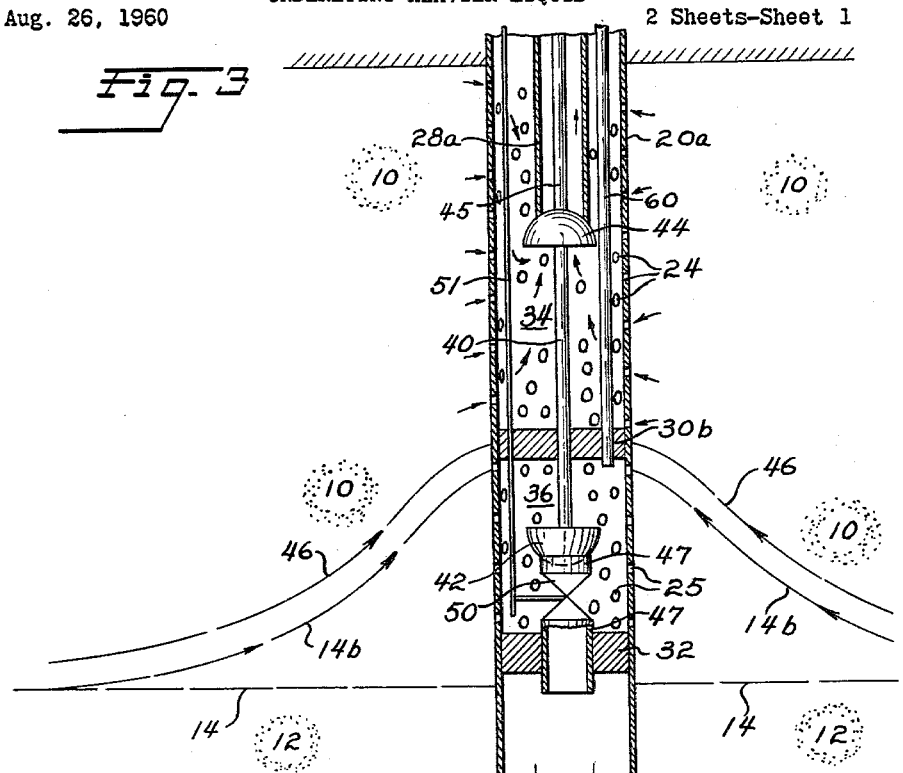
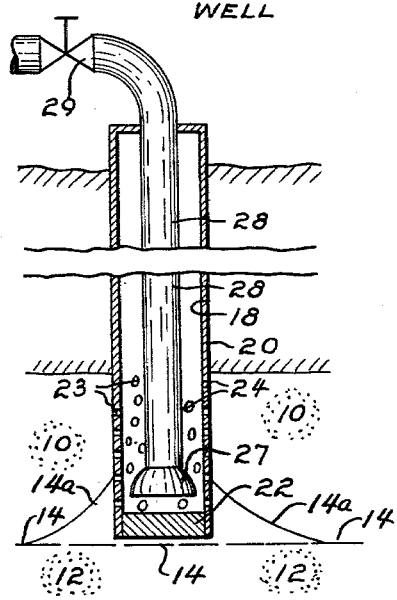
INVENTOR
CHARLES E. JACOB
BY Henry Shur
ATTORNEY INVENTOR
CHARLES E. JACOB
BY Henry Shur
ATTORNEY 3,195,633
METHOD AND APPARATUS FOR PRODUCING FRESH WATER OR PETROLEUM FROM UNDERGROUND RESERVOIR FORMATIONS WITHOUT CONTAMINATION OF UNDERLYING HEAVIER LIQUID
Charles E. Jacob, 8949 Reseda Blvd., P.O. Box 349, Northridge, Calif.
Filed Aug. 26, 1960, Ser. No. 52,103
23 Claims. (Cl. 166—42)

This invention relates to methods and apparatus for removing lighter desired liquid from the upper of two adjacent subterranean liquid-saturated regions in a subsurface reservoir without mixing and contaminating this liquid with the underlying undesired heavier liquid, even at high rates of production.

Fresh water is often produced from a porous subterranean stratum containing a fresh water saturated layer which overlies a salt water saturated layer. Under static conditions, since the salt water is of greater density than the fresh water, it remains beneath the fresh water due to gravity, with a more or less well defined fresh water-salt water static interface. Petroleum hydrocarbons are often similarly produced from a porous subterranean formation in which oil saturated permeable sands overlie water saturated sands, with a more or less well defined static interface between the oil and water, since the water is of greater density and settles below the oil in the oil-producing sands.

Heretofore, the usual practice has been to remove fresh water overlying salt water (or petroleum overlying water) in such a porous subterranean reservoir, by means of a well with perforated casing which incompletely penetrates the porous stratum saturated with the desired lighter liquid and ends some distance above the static interface between the lighter liquid and the undesired heavier liquid. As the well is pumped, or otherwsie caused to discharge, the static balance between the lighter and heavier liquids in the porous subterranean reservoir is upset; and the underlying heavier liquid rises in the area adjacent the well, and invades space formerly occupied by the overlying lighter liquid. This phenomenon or mechanism is known as "coning." Eventually, in a conventional well, the contact between the lighter and heavier liquids in the region of the well may progressively cone and rise to reach the bottom of the well at the level of its intake casing perforations. Thereafter, the heavier undesired liquid will appear as a contaminant in the discharge of the desired lighter liquid from the well, in continuously increasing proportions. In some instances, the rate of discharge of a conventional well is reduced to avoid the effect of coning and keep the well in satisfactory operation, especially where the sub-surface reservoir formation is quite permeable, and/or there is a strong drive imposed on the desired liquid (as in a heavy salt water drive oil well in the Gulf Coast area), making the water coning problem especially serious. However, this solution is not only economically undesirable, but usually merely postpones deleterious coning of the undesired heavier liquid.

Such coning of the undesired underlying heavier liquid produces serious adverse effects, in both water and oil wells.

In producing fresh coastal ground water, an addition of about 1 or 2% sea water resulting in 200–400 parts per million of the chloride ion, from mixture with underlying salt water, will so contaminate the water that it is unsatisfactory for human drinking purposes; and 250 parts per million chloride ion content is the upper limit for public water supply according to U.S. Public Health Service standards. Since there is no commercially satisfactory way for removing an excess of chloride ion from the water, coning of underlying salt water can rapidly ruin a fresh water well, unless it is controlled. A factor which makes the coning problem especially acute in a fresh water well, and makes effective prevention and control thereof especially necessary, is that generally some pump means is required in the well to lift the fresh water from the subterranean reservoir because of lack of natural drive, such as often found in oil wells; and operation of the pump relatively near the fresh water-salt water static interface especially alters the pressure gradients, thus inducing coning of the salt water towards the well intake.

In an oil well, the coning of underlying water results in the pumping of a substantial quantity of water to the surface along with the produced oil, thereby increasing the production cost of each barrel of oil, because of the cost of pumping to the surface and disposing of valueless water. Moreover, substantial additional costs may be incurred if the oil and water emulsify in the well, as frequently happens, since the desired oil must be separated from the emulsion at the surface, which usually requires expensive equipment and chemical treatment. Further, an even more serious result is that the coning of water into the producing area of the oil well often completely shuts off the flow of the oil itself; and it is frequently difficult to treat such an oil well because the normally oil-wet or nearly oil-saturated sand grains ordinarily constituting the oil producing formation have become waterwet in the region surrounding the well.

Accordingly, there have been many prior attempts (including efforts by leading United States oil companies) to provide effective methods and means for removing water block due to coning in oil wells, and especially for preventing deleterious coning of the underlying water during the production of the overlying oil. (All known prior anti-coning efforts are in the field of petroleum production, to prevent water encroachment in oil wells, which however, do not present as serious and difficult a problem as coning in fresh water wells.) For example, in some methods, the stratum surrounding the well bore of an oil well, at the static interface between the oil and water, is injected with cement or an impervious sealing material to prevent water coning. Other methods involve the injection of gases or other materials into the stratum surrounding the well bore, at the static interface to reduce the water permeability of the sands adjacent the well intake where coning might occur. Such methods are only temporarily successful. Upon further exploitation of the overlying oil following treatment, the underlying water will again rise and cone around the well intake, contaminating the oil raised to the surface, and ultimately even rendering the well unusable, with such deleterious coning merely being delayed for a greater or lesser time, depending upon relevant well factors and the effectiveness of the particular method used.

Hence, systems have been proposed for attempting to more or less continuously prevent coning of the underlying water in an oil well by packing off the bottom of the well bore with a single packer, pumping the lighter oil from the oil stratum into the well above the packer, segregating the oil into two portions, passing the larger of said oil portions upward to the surface, and passing the smaller of said oil portions downward towards the underlying water by means of a tube extending through the packer, for the purpose of depressing the underlying water, or diverting the water away from the well intake. However, in such systems, the recirculated portion of the lighter liquid picks up more and more of the heavier liquid by diffusion and/or dispersion. And, since this recirculated portion of lighter liquid is free to mix above the packer with the rest of the lighter liquid taken into the well bore, there is a zone of turbulent mixing in the region of the well pump with resultant diffusion and dispersion of the contaminated recirculated lighter liquid into the lighter liquid raised to the surface, whereby the well product is contaminated with the undesired heavier liquid. These characteristic shortcomings of such systems are especially disadvantageous in a water well, because such diffusion and dispersion of the heavier salt water into the lighter fresh water pumped to the surface will relatively quickly raise its chloride ion content to more than the permissible amount. These shortcomings are also serious in an oil well, since such dispersion and mixing of the underlying water into the oil raised to the surface will ultimately result in raising an excessive quantity of valueless water and/or emulsified oil and water, thereby increasing the cost of production substantially. Also known prior systems of this kind are relatively inflexible and do not contemplate or provide for effective economical field adjustment to readily meet changing liquid. These characteristic shortcomings of such sys- It is a principal object of the present invention to provide a new improved method and apparatus for achieving the recovery of uncontaminated desired lighter liquid overlying a heavier liquid in a porous subterranean reservoir, by drawing in a small amount of the undesired heavier liquid at about, and preferably just above, the position of the normal static interface between the lighter and heavier liquids, and injecting this portion of the heavier liquid into a lower region of the porous stratum saturated with the heavier liquid, while taking in lighter liquid raised to the surface at a point above the well intake of the heavier liquid.

It is a related object of the present invention to provide a new improved method and apparatus for producing uncontaminated lighter liquid overlying undesired heavier liquid in a subterranean reservoir by thus circulating a portion of the heavier liquid in a "closed cell" established below the aforementioned point of intake for the lighter fluid raised to the surface, with a fluid streamline boundary separating the thus-circulated heavier liquid within the "closed cell" from the lighter fluid passing into the well and raised to the surface, thereby virtually eliminating transfer across the streamline boundary of undesired heavier fluid. It is still another related object of this invention to achieve such a new improved well system by novel use of a pair of spaced conventional packers dividing the well bore into a plurality of chambers, with one of the chambers housing the means for circulating and reinjecting the heavier liquid, whereby the upper packer establishes the locus of the above-stated boundary streamline that isolates the desired lighter liquid produced by the well from the undesired heavier liquid.

It is another object of this invention to provide such an improved well system which incorporates throttling means for governing the quantity of heavier liquid circulated through the well and reinjected below the interface in relation to the rate lighter liquid is raised to the surface, to thereby control the streamline boundary between the lighter and heavier liquids which prevents contamination of the lighter liquid. It is a related object to provide such a new method in which a small amount of lighter liquid is drawn into the aforementioned "closed cell" along with a much greater proportion of heavier liquid, thus positively preventing contamination of the lighter liquid raised to the surface.

It is another principal object of the present invention to provide such a new improved method and apparatus for removing uncontaminated desired lighter liquid overlying a heavier undesired liquid in a subterranean reservoir, which is so efficient that this invention can be used to pump fresh water overlying salt water and keep contamination (if any) below 250 parts per million of chloride ion, and prolong useful life of the well, even in coastal areas where there is strong salt water drive. It is another related object to provide such a new improved efficient well method and apparatus which, a priori, is useful in oil wells normally subject to water coning, to virtually eliminate water contamination and/or emulsification of the oil produced, even where there is heavy salt water drive, thereby greatly reducing the cost of production per unit of oil, and also eliminating or minimizing substantial problems of well maintenance.

It is a related object also to provide a new and improved method and apparatus for injecting heavier liquid from the surface into the bottom of a porous stratum containing adjoining layers of a desired lighter liquid and an underlying undesired heavier liquid in such a way as to control the coning of heavier liquid into overlying lighter liquid, the overlying lighter liquid not being stationary as in ordinary injection wells but being in motion towards the upper (production) chamber of this novel combined production-injection well system.

It is another related object also to conserve both the volume and energy of the water in a "bottom-water drive" in an oil field by thus injecting water from the surface to the bottom of the formation in a production well, thus obviating the need to provide companion injection wells for this purpose.

It is another related object of this invention to provide a new improved method and apparatus for removing uncontaminated lighter desired liquid from a subterranean reservoir wherein coning is likely, which permits a greater rate of production of the lighter liquid than would otherwise be possible.

It is another object of the present invention to provide such a new improved method utilizing apparatus that is competitive cost-wise with apparatuses for prior, but less efficient, methods of producing lighter liquid from wells in formations where coning and encroachment of undesired heavier liquid is likely.

Other objects and advantages of the present invention, and how they are achieved, will be apparent from the following description with reference to the accompanying drawings, wherein like components are identified by like numerals, and wherein:

FIGURE 1 shows a diagrammatical vertical cross-section of a conventional oil well in a subterranean reservoir, wherein coning of the undesired heavier liquid has developed adjacent the well pump intake in the layer of porous stratum normally saturated with the desired lighter liquid (fresh water or oil);

FIGURE 2 shows a diagrammatical vertical cross-section of a preferred means for carrying out the new improved method of this invention to produce the desired upper liquid uncontaminated by the heavier undesired liquid, illustrating the involved flow pattern; and FIGURE 3 is a diagrammatical vertical cross-section of a modified embodiment of the method and apparatus of this invention shown in FIGURE 2, wherein heavier liquid is injected from the surface into the subterranean layer of heavier liquid, while the desired lighter liquid is being produced, to maintain the volume and energy of the underlying liquid, especially in a "bottom-water drive" oil well.

Referring now to FIGURE 1 of the drawings, this schematically illustrates a conventional well and the phenomenon of coning of the underlying undesired heavier liquid in a subterranean reservoir from which overlying lighter desired liquid is drawn. The region of the porous stratum saturated with the layer of desired lighter liquid, such as oil or fresh water, is generally indicated by the numeral 10 which is surrounded by dots indicating the permeable sand or other rock of this part of the reservoir formation. The immediately underlying region of the porous statum saturated with the layer of undesired heavier liquid (water in an oil well; salt water in a fresh water well) is indicated by the numeral 12, which is surrounded by dots schematically representing the permeable sand or other rock of this part of the reservoir formation. Prior to the drilling of a well into the formation, there is a more or less well-defined normal static interface 14 between the lighter and heavier liquids in the porous reservoir formation, since these liquids have been segregated by gravity into their respective zones due to their different densities. A well bore 18 is drilled by known techniques through the impermeable strata into the upper lighter liquid producing formation 10, to a point which is slightly above, or sometimes approximately at, the static interface 14 (the top of the heavier liquid layer 12), and a production casing 20 is provided within this well bore 18. The bottom of the well casing 20 is usually cemented, or provided with a packing, indicated by numeral 22, to close off the bottom of casing 20 above the static interface 14 (indicated in broken line adjacent the well). The well casing 20 is provided with perforations 23 above the packing 22 and within the formation 10, through which the desired lighter liquid is drawn into the well and raised to the surface by any of various means. For illustrative purposes, there is diagrammatically shown, in the lower part of casing 20, a pump 27 whose flat lower end is the input end, and whose semi-circular upper end is the output end. The output end of pump 27 is connected to tubing 28, through which the desired lighter liquid is raised to the surface; and the rate of production can be controlled at the surface by a valve 29 in piping 28, if desired. When the desired lighter liquid is produced from sands 10, the upward directed hydraulic gradient associated with the flow of the lighter liquid into the well and to the surface causes the interface between the lighter and heavier fluids to rise in the region adjacent the well, by the above-explained coning phenomenon, as indicated by lines 14a exaggerated due to scale. The rise of coning interface 14a between the lighter and heavier liquids adjacent the well will progress until the apex of the cone reaches the well casing perforations 24. Thereafter, the lighter fluid produced by the well from region 10 will be contaminated by the undesired heavier liquid raised by the well in progressively increasing amount along with the desired lighter liquid, with the deleterious and objectionable effects previously discussed, and ultimately rendering the well unusable without effective cone removal treatment.

Referring to FIGURE 2, this schematically illustrates my new improved method, and a suitable means for carrying it out, to remove desired lighter liquid uncontaminated with the undesired heavier liquid, which would otherwise result due to coning. Suitable current techniques are used to provide a well with circular casing 20a extending through the upper porous reservoir layer 10 saturated by the desired lighter liquid (oil or fresh water), and past the normal static interface 14 a substantial distance into the lower porous stratum 12 saturated with the undesired heavier liquid. The depth of well casing 20a is determined by such factors as the position of the normal static interface 14 between the two liquids before exploitation of the desired lighter liquid from producing region 10, the depth of heavier liquid saturated porous stratum 12 (from interface 14 to underlying impermeable stratum), the size of the well chambers, and capacity of the well pumps. The static interface 14 is located in the field prior to the completion of an oil well through electric logging, drill-stem, or other tests to determine the locus of the oil-water static interface 14. For a water well, the fresh water-salt water interface 14 can be located by running a salinity profile using a conductivity cell and bridge circuit.

The well casing 20a is provided with three spaced perforated sections or "screens"—an upper one 24, a middle one 25, and a lower one 26—which are constructed by one of the methods in current use in the industry. The upper perforated sections 24 and 25 are in the porous stratum 10 above the undisturbed contact or interface 14 between the two liquids; and the lower perforated section 26 is at the lower end of casing 20a, near the bottom of the lower porous stratum 12.

The well apparatus of this invention comprises a pair of spaced upper and lower impervious packers 30 and 32, which separate upper, middle and lower chambers 34, 36 and 38, respectively, in well casing 20a. Packing means 30 and 32 for thus partitioning the well into chambers are not per se a part of the present invention, and are therefore merely diagrammatically shown in cross-section in the drawings. Suitable well packings are presently commercially available; e.g., from several oil-field supply houses.

A common power channel for a lower pump 42 and upper pump 44 is schematically illustrated at 40 and passes through the upper packer 30 with suitable sealing. The pumps 42 and 44 are also illustrated schematically, with the semi-circular pump end being the output end, and the flat pump end being the input end. The output end of the lower pump 42 in middle chamber 36 is connected to lower packing 32 by piping 47, with a suitable throttling valve 50 between pump 42 and packing 32. The output end of the upper pump 44 in upper chamber 34 is connected to suitable piping 28a, through which the desired lighter liquid is raised to the surface. A suitable power input means for upper pump 44 (and for pump 42 through power channel 40) is schematically indicated at 45.

Any of various suitable types of pumps 42 and 44 may be used. For example: (a) The pumps 42 and 44 may be reciprocating plunger pumps, in which case the common power channel 40 and power input means 45 would be suitably connected reciprocating pump rods. (b) The pumps 42 and 44 may be hydraulic cylinder pumps, in which case the common power channel 40 and power input means 45 would be hydraulic power tubing. (c) The pumps 42 and 44 may be turbine pumps with power input means 45 being an elongated shaft rotated by an external prime mover, in which case the common power channel 40 is a rotatable shaft connecting the two turbine pumps 42 and 44. (d) The pumps 42 and 44 may be turbine pumps driven by an adjoining submersible electric motor, in which case the common power channel 40 and power input means 45 would be electric power cable.

It is possible for two different type pumps 42 and 44 to be used, with different appropriate power channels for each of them. Or, pumps 42 and 44 may be of like kind, which separate power channels. However, it is usually preferable to match the pump 42 in chamber 36 with the pump 44 in chamber 34 so that they may share a common power channel 40 and common power input means 45.

The pumps 42 and 44 are simultaneously operated to produce a flow of liquid into and through the three separated upper, middle and lower well chambers 34, 36 and 38, as depicted by arrows in FIGURE 2, and as will now be amplified.

Pump 44 draws lighter liquid from the upper porous stratum 10 through the casing perforations 24 surrounding upper chamber 34 above packer 30; and this lighter liquid, which it is desired to keep uncontaminated by the heavier liquid, is pumped to the surface through discharge pipe 28a. At the same time, liquid, mostly of the lower heavier kind, is drawn into the middle well chamber 36 by lower pump 42, and discharged by pump 42 into lower well chamber 38 through pipe 47 and valve 50. The liquid thus discharged into lower well chamber 38 passes radially outward through the lower well casing perforations 26 into the lower porous stratum 12 surrounding the well. A streamline boundary 46 will develop, separating the lighter liquid drawn into chamber 34 by pump 44 from the liquid reaching lower pump 42 in middle well chamber 36. A typical disturbed position of the contact between the lighter liquid and heavier liquids, due to the action of the well pumps 42 and 44, is shown at 14b. By throttling the flow through lower pump 42, by means of valve 50, the streamline 46 can be made nearly to coincide with disturbed contact 14b, thus reducing the proportion of lighter liquid drawn into middle chamber 36 and reinjected into the well through lower chamber perforations 26. However, to assure non-contamination of overlying lighter liquid above and beyond streamline 46, a small stream of the lighter liquid should be drawn into the middle chamber 36 along with the much greater proportion of heavier liquid for best results. In a fresh water well, this virtually eliminates any transfer of salt across the disturbed interface 14b by diffusion and dispersion. This is a highly desirable feature in a fresh water well, in view of the low permissible chloride ion content, the relative instability of the interface owing to the low fluid density contrast and high miscibility of the two fluids, and the infeasibility of economically removing excess salt content from the water produced by the well. However, it is possible to cut the flow of the lighter liquid into the middle chamber to zero, or even to include some of the heavier liquid in the top flow of lighter liquid into the upper well chamber 34, if a certain amount of contamination is permissible, as in oil wells.

Lower pump 42 passes the intaken heavier liquid through lower well chamber 38, and injects it outwardly and downwardly into the surrounding region of lower porous stratum 12 through the lower open end of casing 20a and lower perforations 26. After a length of time, depending upon such relevant factors as the distance between the lower packing 32 and lower perforated casing section 26 and their relationship to the static interface 14, the rate of discharge of pump 42, and the size of the well chambers, there will be formed a "closed cell" of circulating heavier liquid, schematically indicated by flow lines 49 in FIGURE 2, with the upper limit of this "closed cell" being bounded by the limiting streamline 46 or disturbed interface 14b as previously discussed.

[It is noted that oil well and water well casings are usually plugged in the bottom, and that such plugs are rarely perforated. However, the bottom plug 33 in FIGURE 2 (and FIGURE 3) is shown perforated to permit consistency in the flow line pattern in the distorted scale drawings which must be used.]

Advantage can be taken of any inhomogeneities 53 in the lower stratum 12 by injecting the liquid beneath them and thus delaying its return to the perforated casing section 25 of middle well chamber 36.

It will be noted that the action of the upper pump 44 draws the desired lighter liquid into the well from regions of porous stratum 10 above and outside of streamline 46; and that the upper packing 30 dividing well chambers 34 and 36 definitely establishes the upper locus of streamline 46 and thus the upper boundary of the circulating heavier liquid. Hence, the well system of this invention can produce the desired lighter liquid with radical reduction of contamination compared to prior well systems, and even elimination of such contamination by careful control.

It is noted that the "closed cell" of circulating heavier liquid will ordinarily be as illustrated in FIGURE 2 for a balanced well, but that the flow of heavier liquid is likely to differ in the case of two neighboring wells where one is stronger than the other. In the latter instance, the lower pump (42) of the stronger well is likely to draw some of the heavier liquid from the lower stratum of the weaker well, and circulate the same through the middle and lower chambers of the stronger well. Although in this case, the respective circulating heavier liquid cells of the adjacent wells are not closed upon each well, these cells are still closed in the sense that the circulating heavier liquid is isolated from the desired lighter liquid, whereby the lighter liquid can be produced from the upper well chamber without contamination by the heavier liquid, as above described.

Initially, the lower pump 42 would circulate up to approximately 10% of the volume of lighter liquid pumped by the upper pump 44. As time goes on, however, and the lower heavier fluid rises in the subterranean reservoir, the discharge rate of the lower pump 42 would be increased gradually. This ratio would therefore rise to the economical limit, which might be in the order of 50%. Also, as time goes on, it might be desirable to include a larger quantity of upper layer liquid in the incoming stream between streamline 46 and disturbed interface 14b to minimize contamination.

The volume of heavier liquid circulated by pump 42 compared to the volume of lighter liquid raised by pump 44 can readily be changed, as well conditions change, by using throttling valve 50 of any suitable type available in the industry, with various mechanical, hydraulic, or solenoid means shown schematically at 51, for controlling the valve from the surface. A throttling valve can additionally or alternatively be placed in eduction pipe 28a at the surface, to govern the well operation by controlling the rate of production of the desired lighter liquid from the well. However, throttling of lower pump 42 by valve 50 in pipe 47 is preferable for such control purposes, since throttling of eduction pipe 28a may unnecessarily cut the rate of well production of the desired lighter liquid.

It can be determined in the field by known techniques whether the throttling of the lower pump 42 and resultant control of the spacing between streamline 46 and disturbed interface 14b is satisfactory. For example, in a water well, the total dissolved solids in the water produced by the well may be measured from time to time by means of a conductivity cell and bridge circuit; and these values can be compared with the results obtained from the salinity profile run before the well system was installed. By this means, it can be determined what proportions of top lighter liquid and heavier bottom liquid are being drawn into the well by each of pumps 42 and 44.

In a typical installation of my new improved well system of this invention, according to FIGURE 2 (or FIGURE 3), the lower packing 32 is set near to, and preferably just above, the normal static interface 14. (Packing 32 possibly could be set below the interface 14 approximately 5 to 10 feet or more, depending on the size of well chambers 34, 36 and 38, and other relevant factors). For effective practice of this invention, the lower casing perforations 26 are a substantial distance below the normal static interface 14—usually in the order of 50 to a few hundred feet, with a probable minimum of 5 to 10 feet. The upper packing 30 may be spaced from the lower packer 32 between 10 to 100 feet. The upper pump 44 may be spaced from the upper packer 30 as much as 100 feet, depending on such factors as the depth of the upper stratum 10 saturated with lighter liquid. The relative spacing of the pumps 42 and 44 in the well casing 20a is largely a matter of convenient arrangement and ordinarily will have little or no effect on the efficiency of my new improved method illustrated in FIGURE 2. The size of the well casing 20a may vary from 8 to 24 inches in diameter, thus varying the size of the well chambers 34, 36 and 38 accordingly. It is not necessary to place the lower end of casing 20a and lower perforated casing section 26 adjacent the impermeable bottom underlying the permeable stratum 12 which is saturated with heavier liquid. The choice of the location of perforated casing section 26, and thus the locus of injection of heavier liquid into the lower stratum 12 would be determined on the basis of several considerations, of which this is one. The size of the well chambers 34, 36 and 38, and the respective capacities of pumps 42 and 44, do in part determine the proper location of the lower packing 32 and casing perforations 26 with respect to the normal static interface 14. As previously indicated, the respective depth of lighter liquid saturated porous stratum 10 and of heavier liquid saturated porous stratum 12, are also relevant factors in determining the position of various elements of the well system of this invention.

The depth of the well casing 20a, location of the lower packing 32 with respect to the static interface 14, relative spacing of the two packers 32 and 34, (and thus length of chambers 34, 36 and 38) and location of casing perforations 24, 25 and 26, can be predetermined for a particular well in accordance with various relevant factors, as discussed above.

Referring now to FIGURE 3, this schematically shows a modified well apparatus and method according to the present invention, for injecting heavier liquid into the bottom of the porous stratum as the lighter liquid is withdrawn.

The well apparatus of this embodiment is identical with that of FIGURE 2, excepting that a pipe 60 extends from the surface through the upper packer, identified by numeral 30b in this figure. Hence, for clarity and to avoid undue duplication of description, other parts of the well system of FIGURE 3 which are identical with that of FIGURE 2 are identified by like numerals as in FIGURE 2; and further description thereof is believed unnecessary.

The method of FIGURE 3 is carried out similarly to the above-described method of FIGURE 2. However, as the desired lighter liquid is withdrawn from the well by the upper pump, a suitable quantity of heavier liquid is injected from the surface through pipe 60 into the middle well chamber 36, to augment the heavier liquid of the lower reservoir formation, in lieu of the lighter liquid produced from the well.

It will be noted that, in this system of FIGURE 3, heavier liquid is injected into the bottom of a porous reservoir stratum containing adjoining layers of a desired lighter liquid and an underlying undesired heavier liquid while the well system controls the coning of heavier liquid into the overlying lighter liquid; and that the overlying lighter liquid is not stationary as in ordinary injection wells, but is in motion towards, and produced from, the upper production chamber 34 of this combined production-injection well system of FIGURE 3.

The well system of FIGURE 3 is particularly useful to conserve both the volume and energy of the water in a "bottom water drive" in an oil field by thus injecting water to the bottom of the formation in a production well, thereby obviating the need to provide companion injection wells for this purpose.

Injection piping 60 would of course be provided at the surface with suitable pump, valve and related means, in a manner that will be apparent to those skilled in the art.

The components of the well system of FIGURE 3 are located with respect to the porous strata 10 and 12 and the static interface 14 and with respect to each other, as are like components of FIGURE 2 as discussed above.

The well apparatus of the present invention disclosed in either of FIGURES 2 or 3 is installed by techniques known in the art. For example, referring to FIGURE 2, after the well casing 20a has been installed, the lower packing 32, piping 47, throttling valve 50, lower pump 42, power channel 40, upper packing 30, upper pump 44, and the first section of eduction piping 28a would be assembled, with the packers 30 and 32 retracted, and lowered into the casing 20a. Then the eduction pipe column 28a would be made up a joint at a time and lowered step by step into the well until the lower packer 32 reaches the desired position in the reservoir, which can be calculated after determining the locus of static interface 14 and the depth and thickness of upper porous liquid layer 10 by known means. The packers 30 and 32 would then be expanded and set from the surface by the means provided on commercially available packers. Thereafter, the piping arrangement is completed at the surface to conduct the fluid from the piping 28a to the desired point of storage or discharge. With an "elongated" well apparatus, the retracted packers 30 and 32, pumps 42 and 44, related piping, valve, and power channel and power input means, can be progressively assembled and lowered into the well casing, by techniques known in the art, until the packers 30 and 32 are at the desired level in the well and expanded from the surface to fix position of the well apparatus.

It will be noted that the well apparatus of this invention shown in either of FIGURES 2 and 3 is movable as an assembly within the well casing 20a, by retracting the packers 30 and 32 (or 30b and 32) and raising or lowering the eduction piping 28a. This feature provides flexibility and enables more effective practice of the above-described new improved anti-contamination method of this invention, since the well apparatus can be readily and economically raised (or lowered) and reset in the field, especially as the lower heavier undesired fluid ultimately rises and invades a part of porous reservoir stratum 10 originally occupied by the desired lighter liquid.

The particular pairing arrangement of well pumps 42 and 44 as shown in FIGURE 2 or 3 is not per se an essential feature of the present invention. It is only necessary to utilize a suitable pumping arrangement for achieving the new improved method herein disclosed. In cases where the well flows by release of natural reservoir energy, the upper pump 44 may be omitted, later to be installed if and when needed as that energy is spent. Other suitable well apparatuses are disclosed in FIGURES 2, 6, 7 and 8 and portions of the specification relating thereto, in my copending application entitled "Method and Apparatus for Producing Fresh Water or Petroleum from Underground Reservoir Formations and to Prevent Coning," Serial No. 52,102, now abandoned, executed and filed on the same date as this application. Of course, utilization of the well apparatuses disclosed in the aforementioned copending application to carry out the new improved method of the present invention requires placement of the lower packing (indicated by numeral 42 in my other application) near, and preferably just above, the static interface 14, rather than at a substantially greater distance above the interface as in the method of my other copending application. Also, the well casing must be extended a substantial distance into the underlying heavier liquid saturated strata, with provision of a lower group of perforations (such as indicated at 26 in FIGURES 2 and 3, of this case). Adaptation of the apparatuses disclosed in FIGURES 2 and 6–8, and related portions of the specification of my aforesaid copending application, to carry out the methods of the present invention, as herein disclosed with reference to FIGURES 2 and 3, will be apparent to those skilled in the art from a reading of both my applications.

A specific form of well apparatus for carrying out the method of the present invention, and more especially a well system incorporating double packers to divide the well into three chambers, with a pair of opposed pumps of the plunger type in the middle and upper chambers, respectively, is fully disclosed in FIGURES 5, 9 and 9A of my aforementioned copending application and portions of the specification relating thereto.

In addition to the above-discussed throttling valve means 50-51 in FIGURES 2 and 3, various alternative throttling means can be used to adjust the amount of heavier liquid circulated by lower pump 42 in relation to the amount of lighter liquid lifted to the surface by upper pump 44. For example: (a) by appropriately selecting the sizes of pumps 42 and 44 if they are driven at the same speed, as in the case of turbine pumps; or (b) by driving the two pumps at different speeds if they are submersible electric motor pumps, having individual motors; or (c) by using different diameter plungers in the case of a reciprocating pump; or (d) to some extent, by adjustment of the distances between the packers 30 and 32 for pumps 42 and 44 of a given size. However, such methods are relatively inflexible, and it is preferable to use a throttling valve for lower pump 42, operable from the surface, as shown at 50-51 in FIGURES 2 and 3.

The new improved anti-contamination method of the present invention and the above-described means for carrying it out, can be employed in an old well where coning has occurred, after the well has been cleaned and redeveloped by any of several techniques known in the art. In the case of a water well, however, extreme care must be taken not to disturb the underlying body of salt water any more than necessary. After the well is cleaned and redeveloped by such known techniques, the interface between the overlying desired lighter liquid and the underlying undesired heavier liquid is determined by known techniques. For example, in such a redeveloped water well, conductivity profiles are run under various rates of production to determine the interface. The interface having been found, the approximate height of the lower packer 32 can be calculated; and the well apparatus of this invention is then installed as previously described.

It will be apparent from the foregoing description that the present invention provides a new improved and highly efficient method and apparatus for removing a lighter desired liquid from over an underlying undesired heavier liquid in a subterranean reservoir, without mixing or contaminating the lighter liquid with the heavier liquid, and also for continuously preventing the adverse effect of pronounced and uncontrolled "coning" of the underlying heavier liquid which would normally otherwise occur; and that my new improved method and apparatus of this invention achieve the objects and advantages and improved results set forth earlier in this application, and overcome serious obstacles for the production of uncontaminated lighter liquid from such reservoirs, and eliminate the serious shortcomings of many prior attempts to solve these problems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and discussion of mode of operation, and all changes which come within the meaning and range of equivalency of the claims are therefore intended to be embraced therein.

What is claimed and desired to be secured by United States Letters Patent is:

1. A method of removing a lighter liquid from an underground reservoir formation in which said lighter liquid overlies a heavier less desirable liquid, with a normal static interface between said lighter and heavier liquids, comprising: providing a well which penetrates the reservoir stratum saturated with the lighter liquid and a substantial distance below said normal static interface into said stratum saturated with the heavier liquid; dividing said well into lower, intermediate, and main upper chambers, by sealing said well at two spaced locations, with the top of said lower chamber being at about the level of said static interface, with a passageway between said lower and intermediate chambers; circulating a portion of heavier liquid into said middle chamber of the well and thence through said passageway into said lower well chamber, and injecting said portion of heavier liquid outwardly from said lower well chamber at a substantial distance below said normal static interface; and removing to the surface the lighter liquid passing from the reservoir formation into the main upper chamber of the well.

2. A method of removing a lighter liquid from an underground reservoir formation as defined in claim 1, wherein: a pump is operated in said middle well chamber to draw a portion of heavier liquid from the reservoir formation and circulate it through said middle and lower chambers and inject it outwardly from the lower well chamber.

3. A method of removing a lighter liquid from an underground reservoir formation as defined in claim 2, wherein: a second pump is operated in said main upper well chamber to remove said desired lighter liquid from the reservoir formation to the surface.

4. A method of removing a lighter liquid from an underground reservoir formation as defined in claim 1, further comprising: governing of the quantity of the heavier liquid portion circulated through said middle and lower well chambers in relation to the quantity of lighter liquid passing into the main upper well chamber, so that a small quantity of lighter liquid is also circulated through said middle and lower well chambers.

5. A method as defined in claim 1, wherein the lower of the two locations at which the well is sealed is a small distance above the level of said normal static interface.

6. A method of removing a lighter liquid from an underground reservoir formation as defined in claim 1, further comprising: injecting additional heavier liquid from the surface into said middle well chamber so that it is circulated into said lower well chamber and injected outwardly therefrom at a substantial distance below said static interface along with said portion of heavier liquid which is circulated in said middle well chamber from the reservoir formation.

7. A method of removing a lighter liquid from an underground reservoir formation in which said lighter liquid saturates a region of porous stratum overlying a region of porous stratum saturated by a heavier less desirable liquid, with a normal static interface between said heavier and lighter liquids, which comprises: providing a well which penetrates the reservoir formation stratum saturated with the heavier liquid to a point substantially below the static interface; providing a first packer, having a fluid passage therethrough, in said well bore near and above said normal static interface; providing a second packer spaced from and above said first packer, thus dividing said well into a main well chamber above said second packer, an intermediate well chamber between said packers, and a lower well chamber below said first packer; circulating a portion of heavier liquid through said intermediate chamber, said first packer passage and said lower well chamber, and injecting said portion of heavier liquid into the porous stratum outwardly from the well at a substantial distance below said normal static interface and in sufficient quantity to establish streamlines bounding said circulating heavier liquid, with said streamlines being located below the lower end of said upper well chamber; and removing lighter liquid to the surface through said upper well chamber from the region of porous stratum saturated therewith which is above and outside of said streamlines bounding the circulated portion of heavier liquid; said portion of heavier liquid injected outwardly from the well comprising about 10% to 50% of the volume of lighter liquid removed to the surface.

8. A method of removing a lighter liquid from an underground reservoir formation as defined in claim 7, which further comprises throttling the quantity of the portion of heavier liquid circulated through said intermediate and lower well chambers in relation to the quantity of lighter liquid removed from the reservoir formation through said main upper well chamber and thereby controlling the streamline boundary between the heavier liquid and lighter liquid adjacent the well.

9. A method as defined in claim 8, wherein: the quantity of the heavier liquid portion circulated through said intermediate and lower well chambers in relation to the quantity of lighter liquid passing into the upper well chamber is governed so that a small quantity of lighter liquid is also circulated through said intermediate and lower well chambers along with a greater proportion of heavier liquid.

10. A method of removing a lighter liquid from an underground reservoir formation as defined in claim 7, wherein: a pump means is provided in said intermediate well chamber for circulating said portion of heavier liquid through said intermediate and lower well chambers.

11. A method of removing a lighter liquid from an underground reservoir formation as defined in claim 10, wherein: said lighter liquid removed to the surface is drawn into the upper well chamber from the reservoir formation by a second pump means in said main upper well chamber.

12. A method of removing a lighter liquid from an underground reservoir formation as defined in claim 7, further comprising: injecting additional heavier liquid from the surface into said intermediate well chamber so that it is circulated into said lower well chamber and injected outwardly from the well at a substantial distance below said static interface along with said portion of heavier liquid which is circulated in said middle well chamber from the porous reservoir stratum saturated therewith.

13. A method of removing fresh water from an underground reservoir formation in which the fresh water saturates a region of porous stratum overlying a region of porus stratum saturated by salt water, with a normal static interface between said fresh water and salt water layers, which comprises: providing a well bore with casing which penetrates the porous reservoir stratum saturated by salt water to a point substantially below said static interface; providing first packing means having a fluid passage therethrough in said well casing, near and above said static interface, and providing second packing means spaced from and above said first packing means, thus dividing said well casing into an upper main well chamber above said second packing means, an intermediate well chamber between said packing means, and a lower well chamber below said second packing means; providing perforations in said casing above said second packing means and between said first and second packing means, and also at a substantial distance below said normal static interface; pumping a portion of salt water from the surrounding porous reservoir formation through said intermediate well chamber, said passage in the lower first packing means, and the lower well chamber and thence outwardly from the well through said last-mentioned casing perforations, at a substantial distance below said static interface; and pumping fresh water from the porous reservoir formation into said main upper well chamber above said second packing means, and to the surface.

14. A method of extracting fresh water overlying salt water as defined in claim 13, wherein: said portion of salt water is circulated in sufficient quantity to establish a cell of circulating salt water, the upper part of which is bounded by streamlines located below the lower end of said upper well chamber, and wherein the fresh water removed to the surface is drawn into said upper well chamber from the fresh water-saturated porous stratum above and outside of said bounding streamlines of the circulating cell of salt water.

15. A method of extracting fresh water overlying salt water as defined in claim 14, wherein: the relative quantities of said portion of salt water circulated through said intermediate and lower well chambers and of fresh water passing into the upper well chamber are governed by throttling so that a small quantity of fresh water is also circulated through said intermediate and lower well chambers along with a greater portion of salt water, thus preventing contamination of the fresh water raised to the surface.

16. A method of removing oil from an underground reservoir formation in which said oil saturates a region of porous stratum overlying a region of porous stratum saturated with water, with a normal static interface between said layers of oil and water, comprising: providing a well bore with perforated casing which penetrates the porous reservoir stratum saturated with water, to a point substantially below said oil-water static interface; providing a first packing, having a passage therethrough in said well casing near and above said static interface, and providing a second packing spaced from and above said first packing, thus dividing said well bore into an upper main well chamber above said second packing, an intermediate well chamber between said packings, and a lower well chamber below said second packing; providing perforations in said casing above said second packing and between said first and second packings, and also at a substantial distance below said normal static interface; pumping a portion of water through said intermediate chamber and said passage in said first packing and through said lower well chamber, and injecting said portion of water through said last-mentioned casing perforations outwardly from the well at a substantial distance below said static interface and in sufficient quantity to establish a cell of circulating water, the upper portion of which is bounded by streamlines located at least as low as the bottom of said upper well chamber; and removing oil to the surface through said well chambers from the porous oil-saturated stratum above and outside said upper streamlines of the circulating water cell.

17. A method of removing oil from an underground reservoir formation as defined in claim 16, further comprising: injecting water from the surface into said intermediate well chamber so that it is circulated into said lower well chamber and injected outwardly from the well at a substantial distance below said static interface along with said portion of water which is circulated in said intermediate well chamber from the porous reservoir stratum saturated therewith.

18. An apparatus for removing a lighter liquid from an underground reservoir formation in which said lighter liquid saturates a region of porous stratum overlying a region of porous stratum saturated by a heavier less desirable liquid, with a normal static interface between the lighter and heavier liquids, comprising: a well casing which penetrates said reservoir formation stratum saturated with the heavier liquid to a point substantially below said normal static interface; a first packer having a fluid passage therethrough in said casing at a level near that of said static interface; a second packer in said casing spaced from and above said first packer, said packers dividing the well casing into a main upper well chamber above said second packer, a middle well chamber between said packters, and a lower well chamber below said first packer; part of said casing surrounding said upper and middle well chambers being perforated to permit flow of liquid into the well casing from the surrounding porous stratum, and a section of said casing surrounding the lower well chamber being perforated a substantial distance below said first packer pump means in said well casing between said packers for drawing a portion of heavier liquid into said middle well chamber from the surrounding porous stratum and circulating it through said first packer passage and through said lower well chamber and last-mentioned perforated casing section outwardly of the well in the porous stratum saturated with heavier liquid; and means for removing to the surface lighter liquid passing from the porous stratum into said main upper well chamber above said second packer.

19. An apparatus for removing a lighter liquid from an underground reservoir formation as defined in claim 18, further comprising: means for injecting additional heavier liquid from the surface into said middle well chamber so that it is circulated by said pump means into said lower well chamber and injected outwardly of the well through said last-mentioned perforated casing section along with said portion of heavier liquid circulated in said middle well chamber from the porous reservoir stratum by said pump means.

20. An apparatus for removing a lighter liquid from an underground reservoir formation as defined in claim 18, further comprising: throttling means for controlling the quantity of the heavier liquid portion circulated by said pump through said middle and lower chambers in relation to the quantity of lighter liquid removed from the reservoir formation through said upper main well chamber.

21. An apparatus for removing a lighter liquid from an underground reservoir formation as defined in claim 20 wherein: said throttling means comprises a valve interposed between said pump means and said passage in said first packer, and also comprises means for operating said valve from the surface.

22. An apparatus for removing a lighter liquid from an underground reservoir formation as defined in claim 18, wherein said means for removing said lighter liquid to the surface comprises a second pump disposed in said upper main well chamber above said second packer.

23. An apparatus for removing a lighter liquid from an underground reservoir formation as defined in claim 22, wherein: said two pump means are in opposed relation and connected by a common power channel and driven by common power input means; with the outlet of the first-recited pump means being connected by conduit means to the passage in said first packer, and the outlet of the second-recited pump means being connected to eduction piping through which the lighter liquid is raised to the surface.

References Cited by the Examiner
UNITED STATES PATENTS

| | | | |
|---|---|---|---|
| 2,214,064 | 9/40 | Niles | 166—45 |
| 2,281,801 | 5/42 | Reynolds et al. | 166—45 |
| 2,607,426 | 8/52 | Rose | 166—45 |
| 2,886,108 | 5/59 | Piety | 166—106 |

FOREIGN PATENTS 1,109,092  1/56  France.

CHARLES E. O'CONNELL, *Primary Examiner.*
BENJAMIN BENDETT, NORMAN YUDKOFF,
*Examiners.*

UNITED STATES PATENT OFFICE
CERTIFICATE OF CORRECTION

Patent No. 3,195,633                                                         July 20, 1965

Charles E. Jacob

It is hereby certified that error appears in the above numbered patent requiring correction and that the said Letters Patent should read as corrected below.

In the heading to the printed specification, line 7, for "P.O. Box 349" read -- P.O. Box 347 --; column 1, line 37, for "as" read -- is --; column 3, line 19, for "liquid. These characteristic shortcomings of such sys-" read -- conditions as the well is pumped over a period of time. --; column 6, line 44, for "which" read -- with --; column 14, line 40, for "packters" read -- packers --.

Signed and sealed this 3rd day of May 1966.

(SEAL)
Attest:

ERNEST W. SWIDER                                        EDWARD J. BRENNER
Attesting Officer                                              Commissioner of Patents